United States Patent
Briers

(10) Patent No.: US 8,969,457 B2
(45) Date of Patent: Mar. 3, 2015

(54) RADIATION CURABLE COMPOSITION

(71) Applicant: Henkel AG & Co. KGaA, Duesseldorf (DE)

(72) Inventor: David Briers, Hasselt (BE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/798,598

(22) Filed: Mar. 13, 2013

(65) Prior Publication Data

US 2013/0187144 A1      Jul. 25, 2013

Related U.S. Application Data

(63) Continuation of application No. PCT/EP2011/066496, filed on Sep. 22, 2011.

(30) Foreign Application Priority Data

Oct. 6, 2010   (EP) .................................... 10186690

(51) Int. Cl.
*C08G 59/50* (2006.01)
*C09D 163/00* (2006.01)
*C08L 63/00* (2006.01)
*C08G 59/68* (2006.01)
*C08G 65/10* (2006.01)
*C08G 65/18* (2006.01)

(52) U.S. Cl.
CPC .............. *C09D 163/00* (2013.01); *C08L 63/00* (2013.01); *C08G 59/68* (2013.01); *C08G 65/105* (2013.01); *C08G 65/18* (2013.01); *C08L 2312/06* (2013.01)

USPC .......................................................... 524/400

(58) Field of Classification Search
USPC .......................................................... 523/400
See application file for complete search history.

(56) References Cited

U.S. PATENT DOCUMENTS 5,028,645 A * 7/1991 Gugumus et al. ............. 524/102
2004/0225025 A1   11/2004 Sullivan et al.

FOREIGN PATENT DOCUMENTS

| JP | 2006249040 | 9/2006 |
| WO | 2006107803 | 10/2006 |
| WO | 2007050404 | 5/2007 |

OTHER PUBLICATIONS

International Search Report issued in connection with International Patent Application No. PCT/EP2011/066496 mailed on Jan. 18, 2001.

* cited by examiner

*Primary Examiner* — Ling Choi
*Assistant Examiner* — Thuy-Al Nguyen
(74) *Attorney, Agent, or Firm* — Steven C. Bauman

(57) ABSTRACT

The present invention relates to a curable composition, which comprises a) at least one radiation-curable resin, b) at least one specific anti-oxidant and c) at least one photoinitiator salt. The invention further relates to a cured product made from the curable composition. The curable compositions and/or the cured products thereof are particularly suitable as laminating adhesives, sealants, and/or encapsulants for electronic or optoelectronic devices.

15 Claims, No Drawings

RADIATION CURABLE COMPOSITION

The present invention relates to a curable composition, which comprises a) at least one radiation-curable resin, b) at least one specific anti-oxidant and c) at least one photoinitiator salt. The invention further relates to a cured product made from the curable composition. The curable compositions and/or the cured products thereof are particularly suitable as laminating adhesives, sealants and/or encapsulants for electronic or optoelectronic devices.

Radiation curable materials have found increased use as coatings, adhesives, and sealants over the past three decades for reasons including low energy consumption during cure, rapid cure speed through either radical or cationic mechanisms, low curing temperature, wide availability of curable materials, and the availability of solvent-free products. These benefits have made such products especially suited for rapidly adhering and sealing electronic and optoelectronic devices that are temperature sensitive or cannot conveniently withstand prolonged curing times. Optoelectronic devices particularly are often thermally sensitive and may need to be optically aligned and spatially immobilized through curing in a very short time period.

Numerous optoelectronic devices are also moisture or oxygen sensitive and need to be protected from exposure during their functional lifetime. A common approach is to seal the device between an impermeable substrate on which it is positioned and an impermeable glass or metal lid, and seal or adhere the perimeter of the lid to the bottom substrate using a radiation curable adhesive or sealant.

Good barrier sealants will exhibit low bulk moisture permeability, good adhesion, and strong interfacial adhesive/substrate interactions. If the quality of the substrate to sealant interface is poor, the interface may function as a weak boundary, which allows rapid moisture ingress into the device regardless of the bulk moisture permeability of the sealant. If the interface is at least as continuous as the bulk sealant, then the permeation of moisture typically will be dominated by the bulk moisture permeability of the sealant itself.

Curable compositions for display devices are e.g disclosed in U.S. patent application No. 2004/0225025 A1. The curable composition disclosed therein comprises an epoxy resin and a hydroxyl-functional compound, wherein said composition does not remain fully transparent after being exposed to elevated temperatures.

The international patent application No. 2006/107803 A2 teaches a radiation- or thermally-curable oxetane barrier sealant for electronic and optoelectronic devices, which consists essentially of an oxetane compound, a cationic initiator, and optionally one or more fillers and/or optionally one or more adhesion promoters, or one or more epoxy resins.

Notwithstanding the state of technology it is desirable to provide alternative curable compositions suitable as adhesives/coatings for electronic or optoelectronic devices which, after cure, have a good adhesion, are non-tacky and exhibit a low water vapor transmission rate. Moreover it is desirable that these compositions can be cured efficiently within a short period of time, remain transparent over a long period of time and do not show yellowing at normal or elevated temperatures.

Hence it is an objective of the present invention to provide curable compositions suitable as adhesives, sealants and/or coatings for electronic or optoelectronic devices, which can be cured efficiently within a short period of time and exhibit, after cure, a low water vapor transmission rate, a good adhesion and which remain transparent over a long period of time.

The curable composition of the present invention comprises
a) at least one radiation-curable resin;
b) at least one anti-oxidant, comprising at least one structural unit of formula (I),

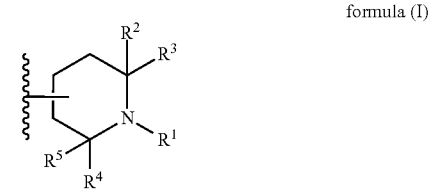

formula (I)

c) wherein $R^1$ is selected from hydrogen, $C_1$-$C_{12}$ alkyl, $C_{1-12}$ alkoxy, $C_3$-$C_{12}$ cycloalkyl, $C_6$-$C_{12}$ aryl or $C_7$-$C_{12}$ aralkyl, and $R^2$, $R^3$, $R^4$ and $R^5$ independently are selected from hydrogen, $C_1$-$C_{12}$ alkyl, $C_3$-$C_{12}$ cycloalkyl, $C_6$-$C_{12}$ aryl or $C_7$-$C_{12}$ aralkyl, with the proviso that at least three of $R^2$, $R^3$, $R^4$ and $R^5$ are not hydrogen; and
d) at least one photoinitiator salt, comprising at least one cation Y and at least one anion X;
wherein the molar ratio of structural units of formula (I) to anions X is from 0.01:1 to 0.75:1.

Another aspect of the present invention is the cured product of the curable composition.

A further aspect of the present invention is the use of the curable composition of the present invention as a laminating adhesive, encapsulant and/or sealant for electronic or optoelectronic devices.

Another aspect of the present invention is a method of affecting the transmission of water vapor with respect to an electronic or optoelectronic device comprising the steps of:
a) applying a curable composition of the present invention to the surface of an electronic or optoelectronic devices; and
b) exposing the surface to actinic and/or ionizing radiation to cure the curable composition.

The term "radiation-curable resin" as used in the present invention refers to any monomer, oligomer or polymer that is curable upon exposure to radiation. The term "radiation" as used herein includes actinic radiation such as ultraviolet radiation and ionizing radiation created by the emission of electrons or highly accelerated nuclear particles such as neutrons, alpha-particles etc. Generally, it is possible to further improve the physical characteristics (e.g., hardness and elastic modulus) of the cured product by thermal post-curing, which means that the cured product of the present invention is exposed to elevated temperatures after it has been cured by exposure to actinic and/or ionizing radiation, such as ultraviolet radiation.

The curable composition of the present invention comprises at least one radiation-curable resin or a mixture of different radiation-curable resins.

The backbone of the radiation-curable resin is not limited. The reactive functionalities on the radiation-curable resins include, but are not limited to oxirane; oxetane; alkenyl such as vinyl, crotyl or allyl; cycloalkenyl; (meth)acrylate; itaconate; maleimide and/or mixtures or combinations thereof.

Suitable radiation-curable resins include radically polymerizable resins such as (meth)acrylate resins or maleimide resins. In many cases, combinations of these two resins can be utilized to tailor the properties of the curable composition/cured product of the present invention.

Representative (meth)acrylate resins include hexane diol diacrylate, trimethylolpropane triacrylate, cyclohexanedimethylol diacrylate, dicyclo-pentadienedimethylol diacrylate, tris(2-hydroxyethyl)isocyanurate triacrylate, poly(butadiene)dimethacrylate, and bisphenol A based acrylated epoxy. Such resins are commercially available from Sartomer and UCB Chemicals.

In one embodiment of the present invention the radiation-curable resin is selected from radiation-curable epoxy resins. Suitable radiation-curable epoxy resins include, but are not limited to, aromatic glycidyl ethers, aliphatic glycidyl ethers, aliphatic glycidyl esters, cycloaliphatic glycidyl ethers, cycloaliphatic glycidyl esters, cycloaliphatic epoxy resins and combinations or mixtures thereof. The radiation-curable epoxy resins of the present invention can include hydrogenated and/or non-hydrogenated epoxy resins.

Representative aromatic glycidyl ethers include bisphenol F diglycidyl ethers (sold under the trade name Epikote 862 from Resolution Performance Products or EXA 835-LV from DIC), bisphenol A diglycidyl ethers (sold under the trade name Epikote 828 from Resolution Performance Products), tetramethyl biphenyldiglycidyl ethers (sold under the trade name RSS 1407), resorcinol diglycidyl ethers (sold under the trade name Erisys RDGE® available from CVC Specialty Chemicals, Inc.).

Representative aliphatic glycidyl ethers are available from Hexion and include 1,4-butanediol-diglycidylether (Heloxy 67), 1,6-hexanediol-diglycidylether (Heloxy modifier HD), trimethyolpropane-triglycidylether (Heloxy 48), neopentylglycol-diglycidylether (Heloxy 68), alkyl C12-14 glycidylether (Heloxy 8), butyl-glycidylether (Heloxy 61), 2-ethylhexyl-glycidylether (Heloxy 116).

Representative cycloaliphatic glycidyl ethers include hydrogenated bisphenol A diglycidyl ethers (sold under the trade name Epalloy 5000 and Epalloy 5001 from CVC Specialty Chemicals; or YX8000 from Japanese epoxy resin Co. Ltd.), hydrogenated polybisphenol A diglycidyl ethers (sold under the trade name YX8034 from Japanese Epoxy Resins), solid hydrogenated polybisphenol A diglycidyl ethers (sold under the trade name YX8040 from Japanese Epoxy Resins), cyclohexanedimethylol diglycidylether (sold under the trade name Heloxy 107 from Hexion), tricyclodecane dimethanol diglycidylether (sold under the trade name EP4088S from Adeka).

Representative cycloaliphatic epoxy resins include 3,4 epoxycyclohexylmethyl 3',4'-epoxycyclohexane carboxylate (sold under the trade name UVA Cure 1500 from Cytec; or UVR-6105, UVR-6107 and UVR-6110 from Dow), bis-(3,4-epoxycyclohexylmethyl)adipate (sold under the trade name UVR-6128 from Dow), 3,4-epoxycyclohexanemethyl 3',4'-epoxycyclohexylcarboxylate modified □-caprolactones (available in various molecular weights as Celloxide 2081, Celloxide 2083, Celloxide 2085, Epolead GT 302 and Epolead GT 403 from Daicel), limonene dioxide (sold under the trade name LDO from Arkema or Celloxide 3000 from Daicel).

Representative aliphatic and cycloaliphatic glycidyl esters include glycidyl ester of neodecanoic acid (sold under the trade name Erisys GS-110 from CVC Specialty Chemicals or Cardura E10P from Hexion), glycidyl ester of linoleic acid dimer (sold under the trade name Erisys GS-120 from CVC Specialty Chemicals), dimer acid diglycidyl ester (sold under the trade name Heloxy Modifier 71 from Hexion), diglycidyl 1,2-cyclohexanedicarboxylate (sold under the trade name Epalloy 5200 from CVC Specialty Chemicals).

The at least one radiation-curable resin or mixtures of different radiation-curable resins can be used in an amount of preferably 10 to 98 percent by weight, more preferably in an amount of 20 to 95 percent by weight, particularly preferably in an amount of 30 to 90 percent by weight, and most preferably in an amount of 60 to 90 percent by weight, each based on the total amount of the curable composition of the present invention.

In one embodiment of the invention the at least one radiation-curable resin is selected from radiation-curable epoxy resins. The total amount of said radiation-curable epoxy resins is preferably in the range of 10 to 98 percent by weight, more preferably in the range of 20 to 95 percent by weight, particularly preferably in the range of 30 to 92 percent by weight, and most preferably in the range of 60 to 90 percent by weight, each based on the total amount of the curable composition of the present invention.

In another embodiment the radiation-curable resin is a mixture consisting of at least one radiation-curable epoxy resin and at least one radiation-curable oxetane resin.

Within this specification, the term "oxetane resin" refers to any monomer, oligomer, or polymer carrying at least one oxetane functionality. The oxetane resin in general can be described by the following structure,

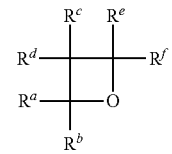

wherein $R^a$, $R^b$, $R^c$, $R^d$, $R^e$ and $R^f$ are independently selected from hydrogen, alkyl, haloalkyl, alkoxy, aryloxy, aryl, ester, thio-ester, or sulfide.

If a mixture consisting of at least one radiation-curable epoxy resin and at least one radiation-curable oxetane resin is used, it is preferred, that the total amount of said radiation-curable epoxy resin is in the range of 10 to 96 percent by weight, more preferably in the range of 20 to 93 percent by weight, particularly preferably in the range of 30 to 90 percent by weight, and most preferably in the range of 40 to 88 percent by weight, and the total amount of the radiation-curable oxetane resin is in the range of 2 to 50 percent by weight, more preferably in the range of 4 to 40 percent by weight, particularly preferably in the range of 6 to 35 percent by weight, and most preferably in the range of 8 to 20 percent by weight.

Representative radiation-curable oxetane resins include 3-ethyl-3-[(2-ethylhexyloxy)methyl]oxetane (sold under the trade name Oxt 212 from Toagosei), 3-ethyl-3-{[(3-ethyloxetane-3-yl)methoxy]methyl}oxetane (sold under the trade name Oxt 221 from Toagoasei), 3-ethyl-3-hydroxymethyloxetane (sold under the trade name Oxt 101 from Toagosei), 3-ethyl-3-cyclohexyloxymethyloxetane (sold under the trade name CHOX from Toagosei).

It is advantageous to use combinations or mixtures of radiation-curable oxetane resins and radiation-curable epoxy resins as radiation-curable resins in the curable compositions of the present invention, because said mixtures exhibit a reduced curing time and a good processing viscosity.

The curable composition of the present invention further comprises at least one anti-oxidant, comprising at least one structural unit of formula (I),

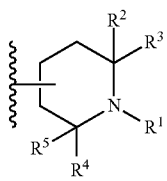

formula (I)

wherein $R^1$ is selected from hydrogen, $C_1$-$C_{12}$ alkyl, $C_{1-12}$ alkoxy, $C_3$-$C_{12}$ cycloalkyl, $C_6$-$C_{12}$ aryl or $C_7$-$C_{12}$ aralkyl, and $R^2$, $R^3$, $R^4$ and $R^5$ independently are selected from hydrogen, $C_1$-$C_{12}$ alkyl, $C_3$-$C_{12}$ cycloalkyl, $C_6$-$C_{12}$ aryl or $C_7$-$C_{12}$ aralkyl, with the proviso that at least three of $R^2$, $R^3$, $R^4$ and $R^5$ are not hydrogen.

The term "$C_{1-12}$ alkyl" as used in the present invention denotes branched and unbranched alkyl groups with 1 to 12 carbon atoms. Preferred are alkyl groups with 1 to 6 carbon atoms. Examples include: methyl, ethyl, propyl, butyl, pentyl or hexyl. The definitions propyl, butyl, pentyl and hexyl include all possible isomeric forms of the groups in question. Thus, for example, propyl includes n-propyl and iso-propyl, butyl includes iso-butyl, sec-butyl and tert-butyl etc. The alkyl groups may not be substituted or may be substituted by one or more groups, preferably selected from hydroxy, fluorine, chlorine, bromine and iodine.

The term "$C_{1-12}$ alkoxy" as used in the present invention denotes branched and unbranched alkoxy groups with 1 to 12 carbon atoms. The oxygen atom of the alkoxy group of the present invention is directly covalently linked to the nitrogen atom of the structural unit of formula (I). Preferred are alkoxy groups with 1 to 6 carbon atoms. Examples include: methoxy, ethoxy, propoxy, butoxy, n-pentoxy, hexoxy, heptoxy, octoxy. The definitions propoxy, butoxy, pentoxy, hexoxy, heptoxy and octoxy include all possible isomeric forms of the groups in question. Thus, for example, propoxy includes n-propoxy and iso-propoxy, butyl includes iso-butoxy, sec-butoxy and tert-butoxy etc. The alkoxy groups may not be substituted or may be substituted by one or more groups, preferably selected from hydroxy, fluorine, chlorine, bromine and iodine.

The term "$C_{3-12}$ cycloalkyl" as used in the present invention denotes cyclic alkyl groups with 3 to 12 carbon atoms. Examples include: cyclopropyl, cyclobutyl, cyclopentyl or cyclohexyl. The cyclic alkyl groups may not be substituted or may be substituted by one or more groups preferably selected from hydroxy, fluorine, chlorine, bromine and iodine.

The term "$C_{6-12}$ aryl" as used in the present invention denotes aromatic ring systems with 6 to 12 carbon atoms. Examples include: phenyl, naphthyl and anthracenyl, the preferred aryl group being phenyl and napthyl. The aromatic groups may not be substituted or may be substituted by one or more groups preferably selected from hydroxy, alkoxy, such as methoxy or ethoxy, fluorine, chlorine, bromine, iodine and nitro.

The term "$C_{7-12}$ aralkyl" as used in the present invention denotes branched and unbranched alkyl groups with 1 to 6 carbon atoms which are substituted by an aromatic ring system with 6 or 10 carbon atoms. Examples include: benzyl, 1- or 2-phenylethyl. The aromatic groups may not be substituted or may be substituted by one or more groups preferably selected from hydroxy, fluorine, chlorine, bromine and iodine.

The presence of a structural unit of formula (I) in the anti-oxidants of the present invention is of great importance for the properties of the curable composition and the corresponding cured products, because comparable compositions, comprising other known anti-oxidants, such as sterically hindered phenols, show significant yellowing after being exposed to elevated temperatures, such as temperatures between 80° C. to 120° C. for more than 4 days.

In one embodiment of the present invention $R^1$ in formula (I) is selected from hydrogen, $C_1$-$C_8$ alkyl, or $C_{3-10}$ alkoxy, and/or $R^2$, $R^3$, $R^4$ and $R^5$ in formula (I) independently are selected from hydrogen or $C_1$-$C_4$ alkyl, with the proviso that at least three of $R^2$, $R^3$, $R^4$ and $R^5$ are not hydrogen.

In one embodiment of the present invention the anti-oxidant comprises at least one structural unit of formula (IV)

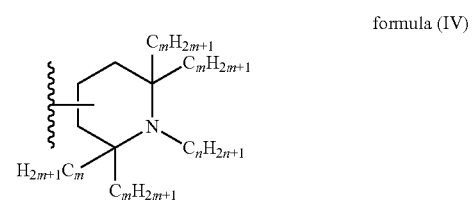

formula (IV)

wherein n is an integer from 1 to 8, preferably from 1 to 6, and more preferably from 1 to 4 and m is an integer from 1 to 8, preferably from 1 to 6, and more preferably from 1 to 4.

In a further embodiment of the present invention the anti-oxidant comprises at least one structural unit of formula (V)

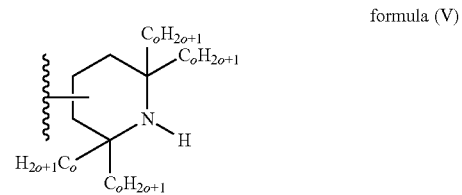

formula (V)

wherein o is an integer from 1 to 8, preferably from 1 to 6, and more preferably from 1 to 4.

In another embodiment of the present invention the anti-oxidant comprises at least one structural unit of formula (VI)

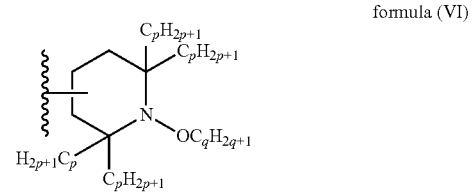

formula (VI)

wherein p is an integer from 1 to 8, preferably from 1 to 6, and more preferably from 1 to 4 and q is an integer from 1 to 10, preferably from 2 to 9, and more preferably from 4 to 8.

One or more structural unit(s) of formulae (I), (IV), (V) and/or (VI) can be part of a small molecule or of an oligomeric or polymeric compound. Preferably two structural units each independently selected from structural units of formula (I), (IV), (V) and/or (VI) are connected by a divalent residue preferably comprising 1 to 100, more preferably 2 to 80, and particularly preferably 4 to 20 carbon atoms, wherein said divalent residue can comprise further heteroatoms, such as oxygen.

In one preferred embodiment of the present invention the anti-oxidant is selected from compounds of formula (II),

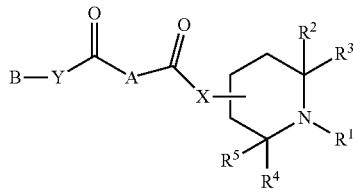
formula (II)

wherein A is a divalent residue, comprising from 1 to 100, preferably 2 to 80, and particularly preferably 4 to 20 carbon atoms, X and Y independently are selected from O, S, or $NR^a$, wherein $R^a$ is hydrogen or a residue selected from the group consisting of aliphatic, heteroaliphatic, araliphatic, heteroaraliphatic, aromatic and heteroaromatic residues, and B is selected from hydrogen, $C_1$-$C_{12}$ alkyl, $C_{1-12}$ alkoxy, $C_3$-$C_{12}$ cycloalkyl, $C_6$-$C_{12}$ aryl, $C_7$-$C_{12}$ aralkyl or functional groups of formula (III),

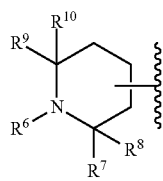
formula (III)

wherein $R^1$ and $R^6$ independently are selected from hydrogen, $C_1$-$C_{12}$ alkyl, $C_{1-12}$ alkoxy, $C_3$-$C_{12}$ cycloalkyl, $C_6$-$C_{12}$ aryl or $C_7$-$C_{12}$ aralkyl, and $R^2$, $R^3$, $R^4$, $R^5$, $R^7$, $R^8$, $R^9$, and $R^{10}$ independently are selected from $C_1$-$C_{12}$ alkyl, $C_3$-$C_{12}$ cycloalkyl, $C_6$-$C_{12}$ aryl or $C_7$-$C_{12}$ aralkyl, with the proviso at least three of $R^2$, $R^3$, $R^4$ and $R^5$ are not hydrogen and, if present, at least three of $R^7$, $R^8$, $R^9$ and $R^{10}$ are not hydrogen.

Preferably $R^1$ and $R^6$ in formula (II) and (III) are each independently selected from hydrogen, $C_1$-$C_8$ alkyl, or $C_{3-10}$ alkoxy, and/or $R^7$, $R^8$, $R^9$ and $R^{10}$ in formula (III) are each independently selected from hydrogen or $C_1$-$C_4$ alkyl, with the proviso that in each structural unit of formula (II) and (III) at least three of $R^7$, $R^8$, $R^9$ and $R^{10}$ are not hydrogen.

In a particular preferred embodiment of the present invention the divalent residue in formula (II) comprises 4 to 14, preferably 6 to 12 and more preferably 10 carbon atoms.

It is further on preferred that X and Y in formula (II) are O (oxygen).

Representative examples of anti-oxidants of the present invention include

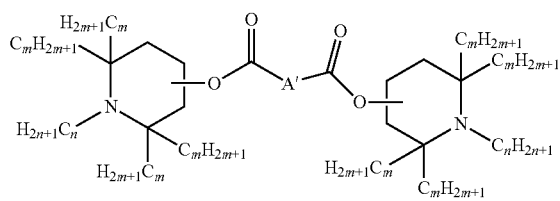

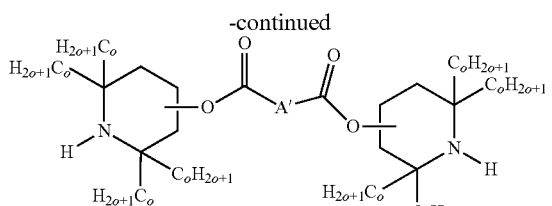

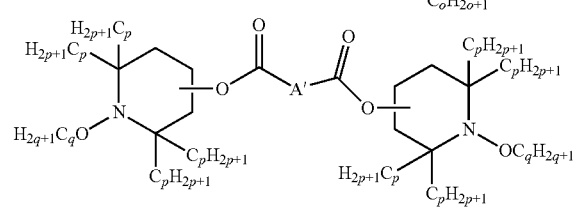

wherein n, m, o, p and q are defined as above and A' is a divalent residue preferably comprising 4 to 14, more preferably 6 to 12 and particularly preferably 10 carbon atoms. In a particular preferred embodiment A' is a divalent residue of formula $*\text{-}(CH_2)_r\text{-}*$, wherein r is an integer from 2 to 12, more preferably from 4 to 10, such as 8.

Anti-oxidants of the present invention are presently available commercially from several sources, including BASF SE, which offers suitable anti-oxidants, such as Tinuvin 123, Tinuvin 292, Tinuvin 622 LD, Tinuvin 770, Tinuvin 144, Chimassorb 944, Chimassorb 119, Tinuvin 791, Tinuvin 783, Tinuvin 111, Chimassorb 2020, Chimassorb 2030, Chimassorb 2040, Uvinul 4049H, Uvinul 4050H, Uvinul 5050H, Tinuvin 492, Tinuvin 494, Tinuvin B 75, Tinuvin C 353, Tinuvin B 241.

Suitable anti-oxidants available from Cytec include Cyasorb UV-3346, Cyasorb UV-3529, Cyasorb UV-3581, Cyasorb UV-3641, Cyasorb UV-3853-S, Dastib 1082.

Suitable anti-oxidants available from Asahi Denka include Mark LA 52, Mark LA 57, Mark LA 62, Mark LA 67, Mark LA 63, Mark LA 68.

Suitable anti-oxidants available from Clariant include Hostavin N 20, Hostavin N 24, Sanduvor 3050, Sanduvor PR-31, Nylostab S-EED.

Suitable anti-oxidants available from B F Goodrich include Goodrite UV-3034, Goodrite UV-3150, Goodrite UV-3159.

Suitable anti-oxidants available from Great Lakes include Lowilite 76, Lowilite 77, Uvasil 299 LM, Uvasil 299 HM, Uvasil 2000 LM, Uvasil 2000 HM.

Other suitable anti-oxidants include Flectol H (available from Monsanto), Agerite Resin D (available from Vanderbilt), Sanol LS-770 (available from Sankyo), Eversorb 90 (available from Everlight), Uvasorb HA 88 (available from 3V Sigma), Luchem HA-B 18 (available from Elf Atochem North America), UV Check AM 806 (available from Ferro), Sumisorb TM 061 and Sumisorb LS-060 (both available from Sumitomo).

The curable composition of the present invention further contains at least one photoinitiator salt, comprising at least one cation Y and at least one anion X.

In the following the terms "photoinitiator" and "photoinitiator salt" are used interchangeably.

A suitable photoinitiator salt is one that exhibits a light absorption spectrum that is distinct from that of the radiation-curable resin, anti-oxidant, and, if present, other additives in the curable composition. If the curable composition of the present invention must be cured through a cover or substrate, the photoinitiator will be one capable of absorbing radiation at wavelengths for which the cover or substrate is transparent.

For example, if a barrier sealant is to be cured through a sodalime glass coverplate, the photoinitiator must have significant UV absorbance above ca. 320 nm.

UV radiation below 320 nm will be absorbed by the sodalime glass coverplate and not reach the photoinitiator. In this example, it would be beneficial to include a photosensitizer with the photoinitiator into the photoinitiating system, to augment the transfer of energy to the photoinitiator.

The counteranion X of the photoinitiator salt balances the positive charge of the cation Y. Suitable anions X include phosphorous or antimony containing anions such as phosphorous or antimony metal complexes with the appropriate number of halogen (such as fluorine) atoms per metal atom. X can preferably be a non-basic, non nucleophilic anion, examples of which include $PF_6^-$, $BF_4^-$, $AsF_6^-$, $SbF_6^-$, $ClO_4^-$, $CF_3SO_3^-$ and the like.

Suitable cations Y for use herein include iodonium or sulfonium cations, such as diaryliodonium cations, triaryliodonium cations, diarylsulfonium cations or triarylsulfonium cations.

Triarylsulfonium and diaryliodonium salts containing non-nucleophilic counterions are appropriate choices, examples of which include diphenyl iodonium chloride, diphenyl iodonium hexafluorophosphate, 4,4-dioctyloxydiphenyl iodonium hexafluorophosphate, diphenyltolylsulfonium hexafluorophosphate, phenylditolylsulfonium hexafluoroarsenate, and diphenyl thiophenoxyphenylsulfonium hexafluoroantimonate, and those commercially available from Sartomer, Exton, Pa. under the SARCAT tradename, such as SARCAT CD 1010 [triarylsulfonium hexafluoroantimonate (50% in propylene carbonate)]; SARCAT DC 1011 [triarylsulfonium hexafluorophosphate (50% in propylene carbonate)]; SARCAT DC 1012 (diaryliodonium hexafluoroantimonate); SARCAT K185 [triarylsulfonium hexafluorophosphate (50% in propylene carbonate)] and SARCAT SR1010 [triarylsulfonium hexafluoroantimonate (50% in propylene carbonate)]; and SARCAT SR1012 (diaryliodonium hexafluoroantimonate), and those commercially available from Dow under the CYRACURE tradename, such as UVI-6976 (mixed triarylsulfonium hexafluoroantimonate salts); UVI-6992 (mixed triarylsulfonium hexafluorophosphate salts).

Additional photoinitiator salts include UV 9385C (an alkylphenyl iodonium hexafluorophosphate salt) and UV 9390C (an alkylphenyl iodonium/hexafluoro-antimonate salt) available commercially from General Electric Corporation; CGI 552 (an alkylphenyl iodonium hexafluorophosphate salt); and RADCURE UVACure 1590 available commercially from UCB, Belgium.

Preferred sensitizers for diaryliodonium salts are isopropylthioxanthone (referred to herein as ITX, often sold as a mixture of 2- and 4-isomers) arid 2-chloro-4-propoxythioxanthone.

However, in order to achieve a particularly good non-yellowing performance it may be desirable that the curable composition of the present invention does not comprise any iodonium cations containing photoinitiator salts.

Particularly preferred photoinitiator salts comprise as cation Y sulfonium cations, such as diarylsulfonium cations or triarylsulfonium cations. By combining these photoinitiator salts with the anti-oxidants described above a curable composition of the present invention can be obtained which exhibits a low water vapor transmission rate and a particularly good non-yellowing performance.

At least one photoinitiator salt or mixtures of different photoinitiator salts can be used in an amount of preferably 0.1 to 5 percent by weight, more preferably in an amount of 0.5 to 4 percent by weight, particularly preferably in an amount of 1 to 3 percent by weight, and most preferably in an amount of 1.5 to 2.5 percent by weight, each based on the total amount of the curable composition of the present invention.

The anti-oxidant (component b) is present in the curable composition of the present invention in an amount such that the molar ratio of structural unit(s) of formula (I) to anion(s) X of the photoinitiator salt is from 0.01:1 to 0.75:1

Preferably the anti-oxidant (component b) is present in an amount such that that the molar ratio of structural units of formula (I) to anions X of the photoinitiator salt is from 0.1:1 to 0.7:1, more preferably from 0.2:1 to 0.65:1, particularly preferably from 0.25:1 to 0.6:1, and more particularly preferably from 0.3:1 to 0.55:1.

The aforementioned amounts of the anti-oxidant do not significantly reduce the curing speed of the curable composition of the present invention. In addition it is possible to prevent any significant yellowing of the cured product of the curable composition of the present invention over a long period of time by using the anti-oxidant in the aforementioned amounts.

In one embodiment the curable composition of the present invention further comprises one or more additives, preferably selected from adhesion promoters, plasticizers, thickeners, oils, pigments, flame retardants, fillers, or rheology modifiers.

Common fillers include, but are not limited to ground quartz, fused silica, amorphous silica, talc, glass beads, graphite, carbon black, alumina, clays, mica, vermiculite, aluminum nitride, and boron nitride. Metal powders and flakes consisting of silver, copper, gold, tin, tin/lead alloys, and other alloys are contemplated. Organic filler powders such as poly(tetrachloroethylene), poly(chlorotrifluoroethylene), and poly(vinylidene chloride) may also be used. Fillers that act as desiccants or oxygen scavengers, including but not limited to, CaO, BaO, $Na_2SO_4$, $CaSO_4$, $MgSO_4$, zeolites, silica gel, $P_2O_5$, $CaCl_2$, and $Al_2O_3$ may also be utilized.

One or more additives, if present, can be used in an amount of preferably 0.1 to 60 percent by weight, more preferably in an amount of 1 to 30 percent by weight, particularly preferably in an amount of 2 to 20 percent by weight, and most preferably in an amount of 3 to 10 percent by weight, each based on the total amount of the curable composition of the present invention.

In one embodiment of the present invention the curable composition comprises or consists of, based on the total amount of the curable composition:

a) from 40 to 95 percent by weight of at least one radiation-curable resin, wherein the radiation-curable resin comprises at least one radiation-curable epoxy resin and optionally at least one radiation-curable oxetane resin;

b) at least one anti-oxidant according to the present invention;

c) from 0.1 to 5 percent by weight of at least one photoinitiator salt according to the present invention;

d) from 0 to 55 percent by weight of at least one additive; wherein the molar ratio of structural units of formula (I) to anions X is from 0.1:1 to 0.7:1.

In another embodiment of the present invention the curable composition comprises or consists of, based on the total amount of the curable composition:

a) from 60 to 90 percent by weight of at least one radiation-curable resin, wherein the radiation-curable resin comprises at least one radiation-curable epoxy resin and optionally at least one radiation-curable oxetane resin;

b) at least one anti-oxidant according to the present invention;

c) at least one photoinitiator salt according to the present invention;

d) from 0 to 30 percent by weight of at least one additive; wherein the molar ratio of structural units of formula (I) to anions X is from 0.2:1 to 0.65:1.

A further typical curable composition of the present invention comprises or consists of, based on the total amount of the curable composition:

a) from 60 to 90 percent by weight of at least one radiation-curable resin, wherein the radiation-curable resin comprises at least one radiation-curable epoxy resin and optionally at least one radiation-curable oxetane resin;

b) at least one anti-oxidant according to the present invention;

c) at least one photoinitiator salt comprising at least one sulfonium cation Y and at least one anion X;

d) from 0 to 30 percent by weight of at least one additive; wherein the molar ratio of structural units of formula (I) to anions X is from 0.2:1 to 0.65:1.

The curable compositions of the present invention are suitable in the preparation of electronic or optoelectronic devices.

For the purposes of this invention optoelectronic devices are defined broadly as those which involve optical and/or electrical input or output signals. Non limiting examples of optoelectronic devices include organic light emitting diode (OLED) displays, OLED microdisplays, liquid crystal displays (LCD), electrophoretic displays, plasma displays, microelectromechanical (MEMS) devices, liquid crystal-on silicon (LCOS) devices, photovoltaic cells, charge coupled device (CCD) sensors, and ceramic-metal oxide semiconductor (CMOS) sensors.

The curable compositions of the present invention can be used as laminating adhesives, encapsulants and/or sealants such as vapor barrier sealants, and/or edge sealants for electronic or optoelectronic devices.

For instance, the present curable compositions are suitable in the fabrication of LCD's. LCD's generally comprise a liquid crystal material that is housed between two sheets, for instance glass sheets or plastic sheets. The present curable compositions may be used to bond the two sheets together, and the compositions may act as a gasket or a (edge) sealant to confine liquid crystal material within the display. Generally, a small gap is left in the gasket. The gap is used to introduce the liquid crystal material into the display. After filling the display with liquid crystal material, the present compositions may be used to seal the gap. The present compositions may also be used to bond electrode terminals to the display.

Further examples of displays in which the present curable compositions may be used include organic light emitting diode (OLED) displays. The present curable compositions are particularly suitable as encapsulants or (edge) sealants for OLED's to protect the organic light emitting layer and/or the electrodes in the OLED's from oxygen and/or water.

Additional examples of displays in which the present curable compositions may be used include electrophoretic displays (EPD). The present compositions are particularly suitable as encapsulants or (edge) sealants for EPD's to protect the electrophoresis layer from moisture ingress in order to prevent a decrease of display quality due to mura.

The curable compositions of the present invention are also suitable in the preparation of photovoltaic cells and/or microelectromechanical devices.

In this context the cured product of the curable composition of the present invention and electronic or optoelectronic devices coated with the cured product of the present invention are further aspects of the present invention.

It is a particular advantage of the cured products of the present invention that said products exhibit a low water vapor transmission rate and/or remain transparent over a long period of time without showing any significant yellowing.

Consequently, preferred cured products of the present invention include those having one or more of the following properties:

a water vapor transmission rate, as measured according to the test method set forth herein, of less than 20 $g/m^2 \cdot day$, preferably less than 15 $g/m^2 \cdot day$, more preferably less than 10 $g/m^2 \cdot day$, and most preferably less than 8 $g/m^2 \cdot day$.

a transparency, as measured according to the test method set forth herein, of at least 70%, preferably of at least 80%, more preferably of at least 82%, and most preferably of at least 85% after exposure to 80° C. for 5 days.

In the present invention the water vapor transmission rate (WVTR) and the transparency are determined as described below (in the examples).

A further aspect of the present invention is the use of the curable composition as a laminating adhesive, encapsulant and/or sealant, such as vapor barrier sealants, and/or edge sealants for electronic or optoelectronic devices. Preferably the present invention is used as a laminating adhesive, encapsulant and/or sealant, such as vapor barrier sealants, and/or edge sealants for electrophoretic displays.

Another aspect of the present invention is a method of affecting, preferably reducing the transmission of water vapor with respect to an electronic or optoelectronic device comprising the steps of:

a) applying the curable composition of the present invention to the surface of an electronic or optoelectronic devices; and b) exposing the surface to actinic and/or ionizing radiation to cure the curable composition.

EXAMPLES

Ingredients used in the curable compositions and comparative formulations are set forth in the following Table (Table 1)

TABLE 1

| Name | Description |
|---|---|
| Epoxy resin 1 | Uvacure ® 1500 from Cytec Industries Cycloaliphatic epoxy resin) |
| Epoxy resin 2 | YX8000 from Japanese epoxy resin Co. Ltd. (Hydrogenated bisphenol A diglycidyl ether) |
| Epoxy resin 3 | Epiclon EXA-835LV from Dainippon Ink and Chemicals Inc. (Bisphenol F diglycidyl ether) |
| Oxt 212 | 3-ethyl-3-[(2-ethylhexyloxy)methyl]oxetane from Toagosei |
| UVI 6976 | Triarylsulfonium hexafluoroantimonate salt, available from Union Carbide (photoinitiator) |
| SILQUEST A187 | Glycidoxypropyltrimethoxysilane from Momentive (Adhesion promoter) |
| Irganox 1010 | Hindered phenol from BASF SE |
| Anti-oxidant 1 | Tinuvin ® 292 from BASF SE Anti-oxidant of the present invention comprising a N-alkyl amine structure |
| Anti-oxidant 2 | Tinuvin ® 770 from BASF SE Anti-oxidant of the present invention comprising a secondary amine structure |

Curable compositions and comparative formulations as set forth in Tables 2 to 5 were prepared, cured and tested. The water vapor transmission rate (WVTR) and the transparency of the cured products were determined according to the following test methods.

Test Methods
Water Vapor Transmission Rate (WVTR)

A cured film of the curable composition/comparative formulation is used to measure the WVTR using a Mocon Permatran—W model 3/33 instrument. Measurement parameters are: 50° C., 100% relative humidity and 1013 mbar. The typical thickness of the cured films ranges from 150 to 250 μm. The values given in Tables 2 to 5 are equilibrated values and are normalized to a film thickness of 1 mm using units of g/m$^2$·day.

Transparency

A typical test sample is prepared as follows:
Two transparent glass plates are attached parallel to each other in a spaced apart relationship by using two stripes of a pressure sensitive adhesive. The cavity defined by the two glass plates and the pressure sensitive adhesive arranged in stripes is filled with the curable composition/comparative formulation. The curable composition/comparative formulation is cured by using 6 J/cm$^2$ UV-A radiation (315 nm-400 nm) to form a cured film between the two glass plates. After 24 hours at 20° C. the initial transparency is determined by passing a light beam of 400 nm wavelength in an orthogonal direction through the glass/cured film/glass laminate. The measurement is repeated after exposing the glass/cured film/glass laminate to an elevated temperature for the given period of time. Each value given in Table 2 to 5 represents the percentage transmittance of 400 nm wavelength light of a glass/cured film/glass laminate wherein the thickness of the cured film is about 200 μm and the thickness of a glass plate is about 1 mm.

The curable compositions, comparative formulations and test results are set forth in the following tables 2 to 5. The total amount of the anti-oxidant is given as the molar ratio of structural units of formula (I) of the anti-oxidant to anions of the photoinitiator salt. All other amounts are given in parts by weight.

TABLE 2

Formulations comprising epoxy resin 1 and different amounts of anti-oxidant 1

|  | Comp. 1 | Ex. 1 (Inv.) | Ex. 2 (Inv.) | Ex. 3 (Inv.) | Comp. 2 |
|---|---|---|---|---|---|
| Epoxy resin 1 | 90 | 90 | 90 | 90 | 90 |
| Oxt 212 | 10 | 10 | 10 | 10 | 10 |
| UVI 6976 | 2 | 2 | 2 | 2 | 2 |
| Silquest A187 | 1 | 1 | 1 | 1 | 1 |
| Anti-oxidant 1 [molar ratio][a] | 0 | 0.23 | 0.4 | 0.55 | 0.78 |
| Water Vapor Transmission rate [g/m$^2$ · day] | 8.0 | 8.0 | 8.0 | 8.0 | N/A (no cure) |
| Initial % Transmittance | 90.5 | 90.5 | 91.0 | 91.2 | N/A (no cure) |
| % Transmittance after 1 hr @85° C. | 84.9 | 87.6 | 90.1 | 90.8 | N/A (no cure) |
| % Transmittance after 120 hrs @85° C. | 78.6 | n.d. | 85.9 | n.d. | N/A (no cure) |
| % Transmittance after 120 hrs @120° C. | 83.1 | n.d. | n.d. | n.d. | N/A (no cure) |
| % Transmittance after 10 days @120° C. | n.d. | n.d. | 88.6 | n.d. | N/A (no cure) |

[a]Molar ratio of structural units of formula (I) of anti-oxidant 1 to SbF$_6$-anions of photoinitiator salt UVI 6976
N/A: not available
n.d.: not determined Table 2 shows the effect of the amount of anti-oxidant 1 on the change of % transmittance after exposing the cured product to elevated temperatures. Without using any anti-oxidant (Comp. 1), yellowing of the cured product was observed after 1 hour at 85° C., wherein a particularly strong yellowing occurred (% Transmittance of 78.6%) after exposing the cured product to a temperature of 85° C. for 120 hours. As shown in Comp. 2 very high concentration of anti-oxidant 1 inhibited the curing of the formulation. A good non-yellowing performance was observed for Ex.1 to Ex.3.

TABLE 3

Formulations comprising epoxy resin 2

|  | Ex. 4 (Inv.) | Comp. 3 |
|---|---|---|
| Epoxy resin 2 | 90 | 90 |
| Oxt 212 | 10 | 10 |
| UVI 6976 | 2 | 2 |
| Silquest A187 | 1 | 1 |
| Anti-oxidant 1 [molar ratio][a] | 0.40 | — |
| Water Vapor Transmission rate [g/m$^2$ · day] | 4.0 | 4.0 |
| Initial % Transmittance | 87.4 | 84.7 |
| % Transmittance after 5 days @120° C. | n.d. | 57.1 |
| % Transmittance after 10 days @120° C. | 87.3 | n.d. |

[a]Molar ratio of structural units of formula (I) of anti-oxidant 1 to SbF$_6$-anions of photoinitiator salt UVI 6976
n.d.: not determined Table 3 demonstrates that formulations based on epoxy resin 2 remained transparent over a long period of time and did not show any significant yellowing at elevated temperatures.

TABLE 4

Formulations comprising phenolic-based anti-oxidants

|  | Comp. 4 | Comp. 5 | Comp. 6 |
|---|---|---|---|
| Epoxy resin 1 | 90 | — | — |
| Epoxy resin 2 | — | 90 | — |
| Epoxy resin 3 | — | — | 90 |
| Oxt 212 | 10 | 10 | 10 |
| UVI 6976 | 2 | 2 | 2 |
| Silquest A187 | 1 | 1 | 1 |
| Irganox 1010 [molar ratio][b] | 0.35 | 0.35 | 0.35 |
| Water Vapor Transmission rate [g/m$^2$ · day] | 8.0 | 4.0 | N/A |
| Initial % Transmittance | 89.9 | 80.7 | 65.3 |
| % Transmittance after 1 day @70° C. | 73.9 | 57.5 | N/A |

[b]Molar ratio of phenolic OH-groups of Irganox 1010 to SbF$_6$-anions of photoinitiator salt UVI 6976
N/A: not available Comparative examples 4 to 6 (Table 4) show the effect of using phenolic-based anti-oxidants (Irganox 1010) on the % transmittance for different types of formulations. In all cases yellowing was observed after exposing the UV-cured products to elevated temperatures. Notably, the formulation of Comp. 6 exhibited significant yellowing in the course of the UV curing process.

TABLE 5

Formulations comprising anti-oxidant 2

| | Ex. 5 (Inv.) | Ex. 6 (Inv.) |
|---|---|---|
| Epoxy resin 1 | 90 | — |
| Epoxy resin 2 | — | 90 |
| Oxt 212 | 10 | 10 |
| UVI 6976 | 2 | 2 |
| Silquest A187 | 1 | 1 |
| Anti-oxidant 2 [molar ratio][c] | 0.43 | 0.43 |
| Water Vapor Transmission rate [g/m² · day] | 8.0 | 4.0 |
| Initial % Transmittance | 91.2 | 86., 4 |
| % Transmittance after 10 days @90° C. | 85.9 | 85.5 |
| % Transmittance after 10 days @100° C. | 86.9 | 83.8 |
| % Transmittance after 10 days @120° C. | 86.8 | 82.4 |

[c]Molar ratio of structural units of formula (I) of anti-oxidant 2 to SbF$_6$-anions of photo-initiator salt UVI 6976

Example 5 and 6 (Table 5) show the effect of using a different type of anti-oxidant of the present invention on the % transmittance for different types of UV-curable resins. In all cases no significant yellowing occurred when exposing the cured products to elevated temperatures.

What is claimed is:

1. A curable composition, comprising
   a) at least one radiation-curable resin;
   b) at least one anti-oxidant, comprising at least one structural unit of formula (I),

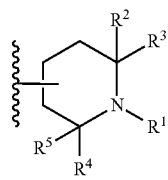

formula (I)

wherein $R^1$ is selected from hydrogen, $C_1$-$C_{12}$ alkyl, $C_{1-12}$ alkoxy, $C_3$-$C_{12}$ cycloalkyl, $C_6$-$C_{12}$ aryl or $C_7$-$C_{12}$ aralkyl, and $R^2$, $R^3$, $R^4$ and $R^5$ independently are selected from hydrogen, $C_1$-$C_{12}$ alkyl, $C_3$-$C_{12}$ cycloalkyl, $C_6$-$C_{12}$ aryl or $C_7$-$C_{12}$ aralkyl with the proviso that at least three of $R^2$, $R^3$, $R^4$ and $R^5$ are not hydrogen; and
   c) at least one photoinitiator salt, comprising at least one cation Y and at least one anion X;
wherein the molar ratio of structural units of formula (I) to anions X is from 0.01:1 to 0.75:1.

2. The curable composition of claim 1, wherein the radiation-curable resin is selected from radiation-curable epoxy resins.

3. The curable composition of claim 1, wherein the anti-oxidant is selected from compounds of formula (II),

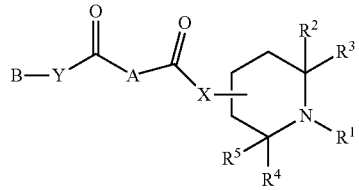

formula (II)

wherein A is a divalent residue, comprising from 1 to 100 carbon atoms, X and Y independently are selected from O, S, or $NR^a$, wherein $R^a$ is hydrogen or a residue selected from the group consisting of aliphatic, heteroaliphatic, araliphatic, heteroaraliphatic, aromatic and heteroaromatic residues, and B is selected from hydrogen, $C_1$-$C_{12}$ alkyl, $C_{1-12}$ alkoxy, $C_3$-$C_{12}$ cycloalkyl, $C_6$-$C_{12}$ aryl, $C_7$-$C_{12}$ aralkyl or functional groups of formula (III),

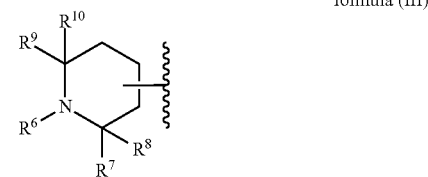

formula (III)

wherein $R^1$ and $R^6$ independently are selected from hydrogen, $C_1$-$C_{12}$ alkyl, $C_{1-12}$ alkoxy, $C_3$-$C_{12}$ cycloalkyl, $C_6$-$C_{12}$ aryl or $C_7$-$C_{12}$ aralkyl, and $R^2$, $R^3$, $R^4$, $R^5$, $R^7$, $R^8$, $R^9$, and $R^{10}$ independently are selected from $C_1$-$C_{12}$ alkyl, $C_3$-$C_{12}$ cycloalkyl, $C_6$-$C_{12}$ aryl or $C_7$-$C_{12}$ aralkyl, with the proviso at least three of $R^2$, $R^3$, $R^4$ and $R^5$ are not hydrogen and, if present, at least three of $R^7$, $R^8$, $R^9$ and $R^{10}$ are not hydrogen.

4. The curable composition of claim 3, wherein X and Y are O.

5. The curable composition of claim 1, wherein the cation Y of the photoinitiator salt is selected from iodonium or sulfonium cations and/or the anion X of the photoinitiator salt is selected from phosphorous or antimony containing anions.

6. The curable composition of claim 5, wherein the cation Y of the photoinitiator salt is selected from sulfonium cations and the anion X of the photoinitiator salt is selected from phosphorous or antimony containing anions.

7. The curable composition according to claim 1, further comprising at least one additive selected from adhesion promoters, plasticizers, thickeners, oils, pigments, flame retardants, fillers, or rheology modifiers.

8. The curable composition according to claim 1, comprising
   a) from 40 to 95 percent by weight of at least one radiation-curable resin, wherein the radiation-curable resin comprises at least one radiation-curable epoxy resin and optionally at least one radiation-curable oxetane resin;
   b) at least one anti-oxidant;
   c) from 0.1 to 5 percent by weight of at least one photoinitiator salt;
   d) from 0 to 55 percent by weight of at least one additive;
wherein the molar ratio of structural units of formula (I) to anions X is from 0.1:1 to 0.7:1.

9. The cured product of the curable composition according to claim 1.

10. The cured product of claim 9, wherein said cured product has water vapor transmission rate of less than 10 g/m²·day.

11. An electronic or optoelectronic device coated with the cured product of claim 9.

12. The electronic or optoelectronic device of claim 11, in which the device is selected from organic light emitting diode (OLED) displays, OLED microdisplays, liquid crystal displays (LCD), electrophoretic displays, plasma displays, microelectromechanical (MEMS) devices, liquid crystal-on silicon (LCOS) devices, photovoltaic cells, charge coupled device (CCD) sensors, and ceramic-metal oxide semiconductor (CMOS) sensors or combinations thereof.

13. A process of using a curable composition as a laminating adhesive, an encapsulant or a sealant for electronic or optoelectronic devices, comprising the steps of:
   applying a curable composition according to claim 1 to at least one surface of an electronic or optoelectronic device; and
   exposing the at least one surface to actinic and/or ionizing radiation to cure the curable composition.

14. A process of using a curable composition as a vapor barrier sealant or edge sealant, comprising the steps of:
   applying a curable composition according to claim 2 to at least one surface of an electronic or optoelectronic device; and
   exposing the at least one surface to actinic and/or ionizing radiation to cure the curable composition.

15. A method of affecting the transmission of water vapor with respect to an electronic or optoelectronic device comprising the steps of:
   a) applying a curable composition according to claim 1 to at least one surface of an electronic or optoelectronic device; and
   b) exposing the at least one surface to actinic and/or ionizing radiation to cure the curable composition,
wherein after the curable composition is cured, the cured composition acts as a barrier sealant.

* * * * *